Sept. 15, 1953      E. B. TURPIN      2,652,087
SANDWICH CUTTING BLOCK
Filed Nov. 2, 1949

INVENTOR.
Elias B. Turpin
BY
Attorney.

Patented Sept. 15, 1953

2,652,087

UNITED STATES PATENT OFFICE 2,652,087

SANDWICH CUTTING BLOCK

Elias B. Turpin, Battle Creek, Mich.

Application November 2, 1949, Serial No. 124,999

3 Claims. (Cl. 146—150)

This invention relates to improvements in sandwich cutting block.

The main objects of this invention are:

First, to provide a portable device which facilitates the preparation of food such as sandwiches and the slicing or cutting into uniform segments.

Second, to provide a device of this character from which the slices or sections of prepared food may be easily removed.

Third, to provide a device having these advantages which may be economically produced and easily kept in a sanitary condition.

Objects relating to details and economies of the invention will appear from the description to follow. The invention is defined and pointed out in the claims.

A preferred embodiment of the invention is illustrated in the accompanying drawing, in which.

Figure 1:
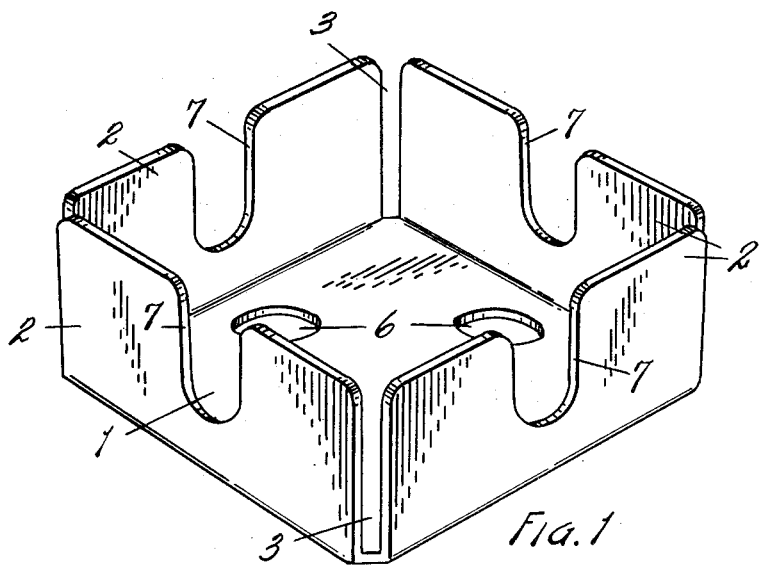
Fig. 1 is a perspective view of a preferred embodiment of my invention.

The device or utensil of my invention comprises a bottom I of suitable dimensions, preferably rectangular, and having upstanding side walls 2 integral therewith. These side walls are spaced at their ends to provide vertical slots 3 adapted to receive the blade 4 of a knife 5. The bottom is provided with finger openings 6 while the side walls have vertical slot-like finger openings 7 extending from their upper edges and aligned with the finger openings 6 in the bottom.

Figure 2:
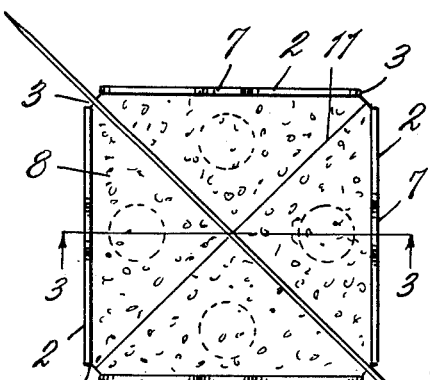
Fig. 2 is a top plan view with sandwich material arranged therein, a knife being shown in slicing position, the slice or cut in one direction being indicated by a line.
Figure 3:
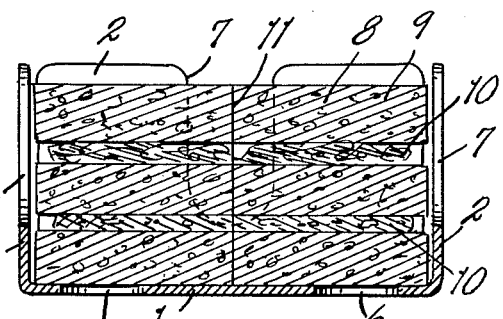
Fig. 3 is an enlarged vertical section on a line corresponding to line 3—3 of Fig. 2, the knife being omitted and the cut being indicated by a line.

In Figs. 2 and 3 I illustrate a sandwich, designated generally by the numeral 8, comprising three slices 9 of bread and with an interposed filler 10. The slices of bread are suitably trimmed and arranged in the holder device in suitable superimposed relation with the filler. The completed sandwich is then sliced diagonally, one cut being illustrated at 11, the blade 4 being shown as forming the second cut. Of course, the second cut would not be necessary unless desired but it is frequently desired to form small triangular sandwiches. The finger openings facilitate the removal of the slices without displacing the layers.

Figure 4:
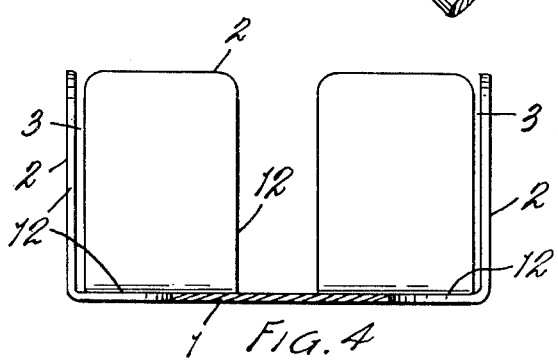
Fig. 4 is a fragmentary view of a modified form of my invention sectioned on a line corresponding to the section line of Fig. 3.

In the modification shown in Fig. 4, the finger openings 12 extend from top to bottom of the walls and into the bottom 1. This enables the grasping of a slice with one finger on top and another on the bottom thereof. The devices are desirably made as sheet metal stampings or they may be formed of plastic. In either case they are easily kept in a sanitary condition and the use thereof greatly facilitates the preparation of food such as sandwiches or the slicing of other food in uniformly dimensioned slices.

I have illustrated my invention in a highly practical embodiment thereof. I desire to point out that the particular dimensions and shape may be varied within the scope of the following claims as desired.

1. A unitary rigid device for use in preparing sandwiches comprising a bottom having rectangularly arranged upstanding walls at its edges and corner slots extending from the tops of the walls to the bottom and adapted to receive the blade of a knife diagonally of the bottom, the walls having finger openings therein facilitating the grasping of the food within the walls.

2. A unitary rigid device for use in preparing sandwiches comprising a rectangular bottom, and upstanding walls along all sides of said bottom spaced at their ends to provide vertical corner openings adapted to receive the blade of a knife diagonally of the bottom, the walls having slots extending from their upper edges and into the bottom providing finger openings facilitating the grasping of food therein.

3. A portable device for use in making sandwiches comprising a rectangular bottom having upstanding angularly associated walls along all its edges spaced at their ends to provide vertical corner slots adapted to receive the blade of a knife diagonally of the bottom, the bottom having finger openings adjacent each wall, the walls having vertical finger receiving slots aligned with the finger openings of the bottom.

ELIAS B. TURPIN.

References Cited in the file of this patent

UNITED STATES PATENTS

| Number | Name | Date |
|---|---|---|
| 280,796 | Chapman | July 10, 1883 |
| 509,714 | Andreasen | Nov. 28, 1893 |
| 731,919 | Larson | June 23, 1903 |
| 1,146,199 | Mostizer | July 13, 1915 |
| 1,340,470 | Faehndrich | May 18, 1920 |
| 1,371,849 | Brown | Mar. 15, 1921 |
| 1,462,717 | Maus | July 24, 1923 |
| 2,108,992 | Obenshain | Feb. 22, 1938 |
| 2,111,910 | Fisher | Mar. 22, 1938 |
| 2,277,888 | Segal | Mar. 31, 1942 |
| 2,452,445 | Ericsson | Oct. 26, 1948 |